(No Model.)
F. H. PALMER.
JAR CLOSURE.
No. 495,364.  Patented Apr. 11, 1893.
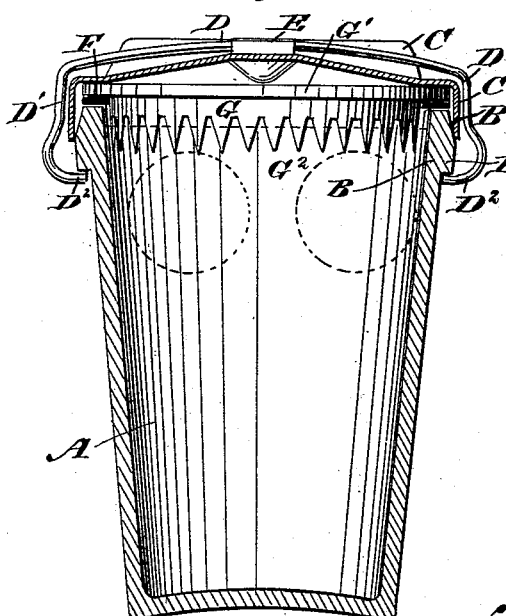
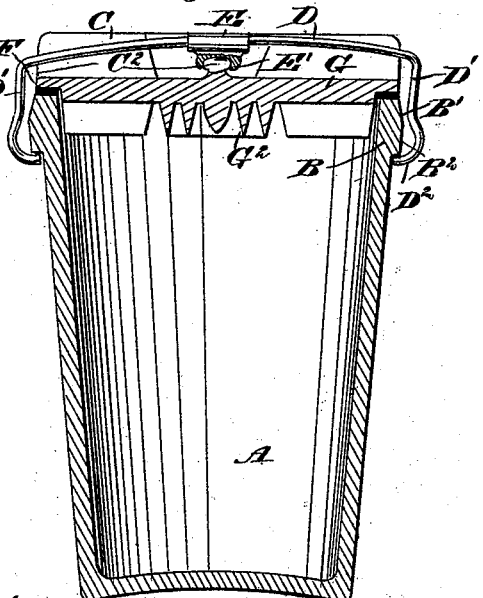
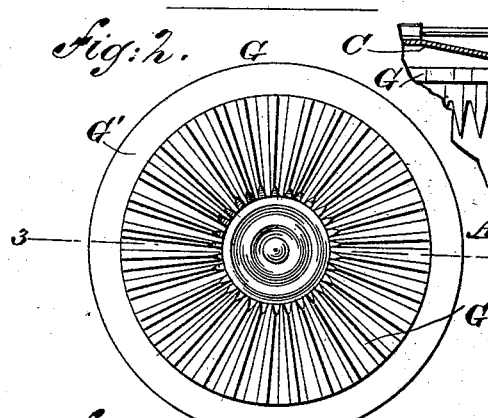
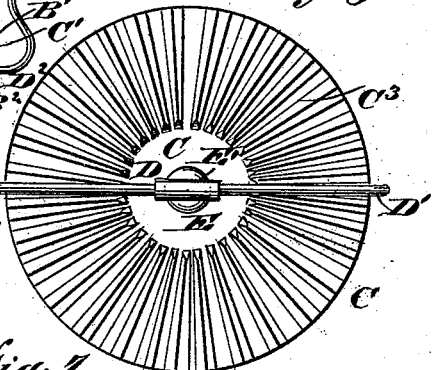
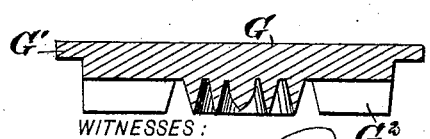
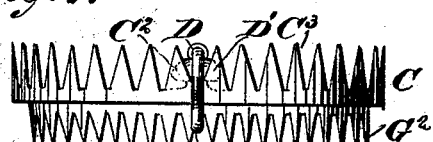
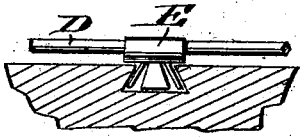
WITNESSES:
Chas. Nield.
C. Sedgwick
INVENTOR:
F. H. Palmer
BY Munn & Co.
ATTORNEYS
THE NORRIS PETERS CO., PHOTO-LITHO., WASHINGTON, D. C.

UNITED STATES PATENT OFFICE.

FRANK. H. PALMER, OF BROOKLYN, NEW YORK.

JAR-CLOSURE.

SPECIFICATION forming part of Letters Patent No. 495,364, dated April 11, 1893.

Application filed November 23, 1891. Renewed September 21, 1892. Serial No. 446,377. (No model.)

*To all whom it may concern:*

Be it known that I, FRANK. H. PALMER, of Brooklyn, in the county of Kings and State of New York, have invented a new and Improved Jar-Closure, of which the following is a full, clear, and exact description.

The object of the invention is to provide a new and improved jar closure, arranged to securely fasten the cover in place on the jar, to seal the latter to prevent leakage, and also to prevent the solid contents, such as fruit for instance, from becoming exposed to the air above the liquid contained in the jar.

The invention consists of a cover plate provided with projections extending into the upper end of the jar to press and hold the solid substances below the level of the liquid contained in the jar.

The invention further consists of a jar formed with an exterior flange having a double bevel, and a cover provided with a bail formed with downwardly-extending arms having inwardly bent lugs abutting on the lower bevel, and adapted to engage, when the bail is pressed, the bottom of the said flange.

The invention also consists of certain parts and details and combinations of the same, as will be hereinafter described and then pointed out in the claims.

Reference is to be had to the accompanying drawings forming a part of this specification, in which similar letters of reference indicate corresponding parts in all the figures.

Figure 1 is a sectional side elevation of the improvement as closed. Fig. 2 is an inverted plan view of the cover plate. Fig. 3 is a sectional side elevation of the same on the line 3—3 of Fig. 2. Fig. 4 is a sectional side elevation of part of the improvement showing the bail in an unlocked position. Fig. 5 is a sectional side elevation of a modified form of the improvement. Fig. 6 is a plan view of the same. Fig. 7 is a side elevation of the combined cover and cover plate; and Fig. 8 is a sectional side elevation of a modified form of bail fastening.

The jar A is provided on its upper end with an exterior flange B formed with two bevels B' and B², extending at an obtuse angle, the bevel B' extending upwardly and inwardly, and the bevel B² extending downward and inwardly, approximately parallel to the outer side of the jar. The upper bevel B' is adapted to be engaged by the annular flange C' of the cover C provided with diametrical grooves through one of which extends the bail D, made of spring wire or other material and fastened in its middle by an eye E to the cover. The ends of the bail D are formed with downwardly-extending arms D' formed at their lower ends with inwardly-extending lugs D² abutting on the upper end of the bevel B² previous to closing the cover, as plainly illustrated in Fig. 4. When in this position, the top of the bail D extends about horizontally in the diametrical groove, but is still below the extreme top of the cover so as to form no projection thereon to interfere with conveniently placing one jar upon the other. When the ends of the bail D are pressed, the arms D' pass downwardly until the lugs D² finally snap under the bottom of the annular flange B, thus engaging the latter, and thereby locking the bail in place and consquently exerting a downward pressure on the cover C so as to close the jar. Inside of the cover C and on the upper edge of the jar A is placed a packing ring F, on which rests the annular flange G' of the cover plate G also arranged within the cover C or forming part thereof, as hereinafter more fully described.

The cover plate G is formed with downwardly-extending projections G² preferably in the shape of teeth extending radially and circularly or either, as desired. The projections G² pass into the liquid contained in the jar A so that the level of the liquid extends close to the under side of the plate G, as indicated by dotted lines in Fig. 1. The projections G² press upon the solid substance contained in the liquid, thus holding the solid substance below the liquid as indicated in dotted lines in Fig. 1. It will be seen that this cover plate prevents exposure of the solid substance, such as fruit for instance, above the level of the liquid contained in the jar. As the solid substance is thus held completely immersed in the liquid it is not liable to be spoiled by coming in contact with the air.

I do not limit myself to the special construction or shape of the projections G², it being however, understood that the same extend below the level of the liquid and hold the solid substance below such level.

The device thus far described is more especially adapted for jars having a metallic cover. Now, for jars having a cover of glass, earthenware or other substance, the cover piece can be readily combined with the cover plate, as plainly shown in Figs. 5, 6 and 7. In this case the flange C' of the cover C is dispensed with, and the outer edge of the cover rests on the packing ring F.

In the middle of the cover C is formed a button C² adapted to engage with spring tongues or flanges E' projecting from the eye E connected with the bail D, above described. The bail D may also be fastened to the cover C by spring tongues pressed into and engaging a conical opening formed in the cover, and as illustrated in Fig. 8. On the top of the cover C are also formed teeth or projections C³ similar to the projections G² formed on the under side of the cover plate G. The bail D extends between two adjacent projections C³, so as to be below the top surface of the said projections to permit of conveniently piling one jar upon the other, as above mentioned.

By constructing the annular flange B with two bevels so that the lugs D² extend on the lower bevel and do not touch the upper bevel or apex of the two bevels, injury to the annular flange is prevented when the ends of the bail are pressed downward. It will be understood that in case the lugs D² should extend above the apex of the double bevel and pressure is exerted on the ends of the bail, the lugs would readily injure and break the flange on passing over the apex or sharp edge. It is understood that the arms D' of the bail have sufficient spring to cause the lugs D² to engage the bottom of the flange B when the ends of the bail are pressed, as above described. The spring tongues E' on the eye E of the bail D permit of connecting the eye E readily within the button C² so that the bail D forms part of the cover and is not liable to become detached.

Having thus fully described my invention, I claim as new and desire to secure by Letters Patent—

1. In a jar closure, the combination, with a jar formed with an exterior flange having an obtuse angle double bevel, the lower bevel extending approximately parallel to the side of the jar, of a cover adapted to close the said jar and having at its under side, projections extending into the jar and serving to press the solid substance below the level of the liquid contained in the jar, and a bail held on the said cover and provided with downwardly extending arms having inwardly bent lugs adapted to pass over the said double bevel to engage, when the bail is pressed, the bottom of the lowermost bevel to hold the cover on its seat and the projections in the jar for the purpose set forth and substantially as shown and described.

2. In a jar closure, the combination, with a jar formed with an exterior flange having a double bevel, of a cover plate for closing the said jar, projections extending downwardly from the said cover into the top of the jar to press and hold the solid substance below the level of the liquid contained in the jar, a bail held on the top of the said cover and formed with downwardly extending arms having inwardly extending lugs adapted to engage the bottom of the said flange, and projections arranged on the top of the said cover and forming diametrical grooves for the passage of the said bail, substantially as shown and described.

3. In a jar closure, the combination, with a jar formed with an exterior flange having a double bevel, of a cover plate for closing the said jar, projections extending downwardly from the said cover into the top of the jar to press and hold the solid substance below the level of the liquid contained in the jar, a bail held on the top of the said cover and formed with downwardly extending arms having inwardly extending lugs adapted to engage the bottom of the said flange, projections arranged on the top of the said cover and forming diametrical grooves for the passage of the said bail, a button formed integrally in the center and on top of the said cover, and spring tongues held on the said bail and engaging the said button, substantially as shown and described.

4. In a jar closure, the combination with a jar formed with an exterior annular flange, of a cover fitted on the said flange and formed at its under side with projections extending into the mouth of the jar and serving to press the solid substance below the level of the liquid contained in the jar, and a bail attached at its middle to the said cover and formed at its free ends with inwardly extending lugs adapted to engage the under side of the said flange to seat the cover on the flange so as to hold the projections in the mouth of the jar in the manner described and for the purpose set forth.

FRANK. H. PALMER.

Witnesses:
THEO. G. HOSTER,
C. SEDGWICK.